Feb. 24, 1959    P. HOLLERT    2,874,974
INDIVIDUAL WHEEL SUPPORT FOR VEHICLES
Filed Nov. 19, 1957    2 Sheets-Sheet 1

INVENTOR
Paul HOLLERT

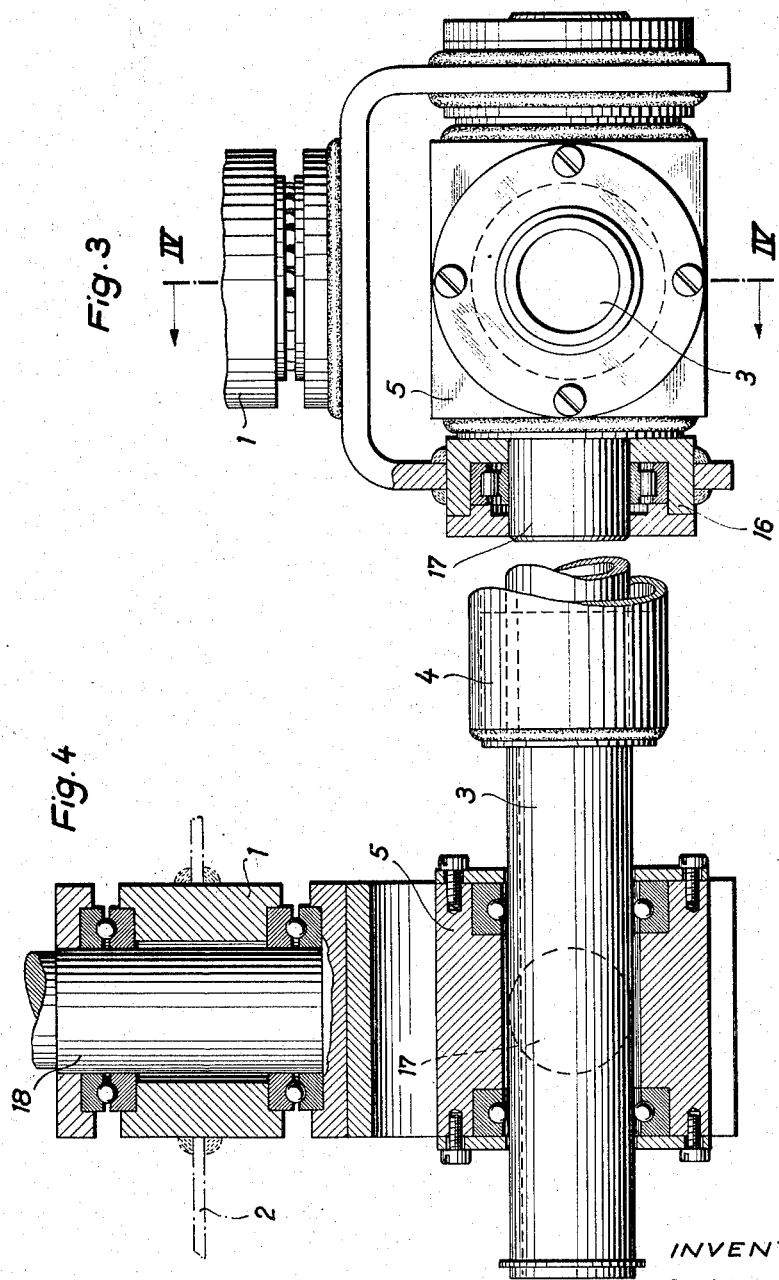

United States Patent Office

2,874,974
Patented Feb. 24, 1959

2,874,974

INDIVIDUAL WHEEL SUPPORT FOR VEHICLES

Paul Hollert, Dusseldorf, Germany

Application November 19, 1957, Serial No. 697,459

Claims priority, application Germany November 21, 1956

1 Claim. (Cl. 280—124)

The present invention relates to an individual wheel support for all types of vehicles, wherein the semi-axle is yieldingly connected with the chassis crosswise to the direction of travel.

It is one object of the present invention to provide an individual wheel support wherein all shocks are received elastically by the wheel by simple means, so that the chassis is not at all or very slightly attacked by the shocks.

In the known individual wheel supports the cross-shocks were reduced either by a spring-biased guide-link disposed between the axle and the chassis and swingable in the direction of the axle, or by resilient mounting of the supporting member, which carries the axle, with the chassis in the direction of the wheel axle.

These embodiments have the drawback, however, that the components of the shocks effective in the direction of the axle of all shocks occurring in the plane of the wheel-axle are received elastically, but all shock components disposed in other directions are not caught, so that additional stresses of the chassis, as well as the occurrence of oscillations could not be avoided. An additional drawback came about also due to the fact that the known embodiments are very complicated in their construction and also very expensive.

In accordance with another known embodiment the wheels are mounted on a lever-arm-like stirrup resiliently carried by the supporting member, whereby the supporting member is mounted for turning upon an axis disposed in the direction of travel together with the stirrup and the wheels.

This embodiment has the drawback, however, that it assumes shocks only in vertical direction or in the direction of travel, while all cross-shocks are transferred towards the chassis.

It is another object of the present invention to provide an individual wheel support wherein all drawbacks of the known structures are avoided by connecting the half-axle with an annular spring-body, the half-axle being mounted in a bearing for vertical swinging, rotatable horizontally and axially movable, whereby the spring-body supports itself all around against the chassis in a horizontal plane.

The embodiment designed in accordance with the present invention has at first the advantage, that all shocks occurring in the plane of the wheel axle, as well as the cross-shocks and the longitudinal shocks are received elastically by the annular spring-body. By this arrangement, no shock components occurring in the plane of the wheel axle are practically transferred to the chassis, even if they are not effective in axial direction.

An additional advantage of the present invention resides in the fact that horizontal shocks on one wheel are not transferred to the opposite wheel. The operational safety of the vehicle is, thereby, greatly increased.

Finally, the arrangement in accordance with the present invention has also the advantage, that the individual wheel support is made possible with simple means and low costs.

It is yet another object of the present invention to provide an individual wheel support wherein the bearing, supporting the half-axle, comprises a bearing bridge, which is connected with a bearing-block which is rotatably secured to the chassis. The annular spring-body surrounds the vertical spring-body which is connected rotatably in axial direction with the half-axle by means of a plate, a bolt and fork-shaped spindle bearings secured to the half-axle. The annular spring-body is advantageously guided in a cylindrical portion of the chassis.

With these and other objects in view which will become apparent in the following detailed description, the present invention will be clearly understood in connection with the accompanying drawings, in which:

Fig. 3 is a section along the lines III—III of Fig. 1; and

Fig. 4 is a section along the lines IV—IV of Fig. 3.

Figure 1:
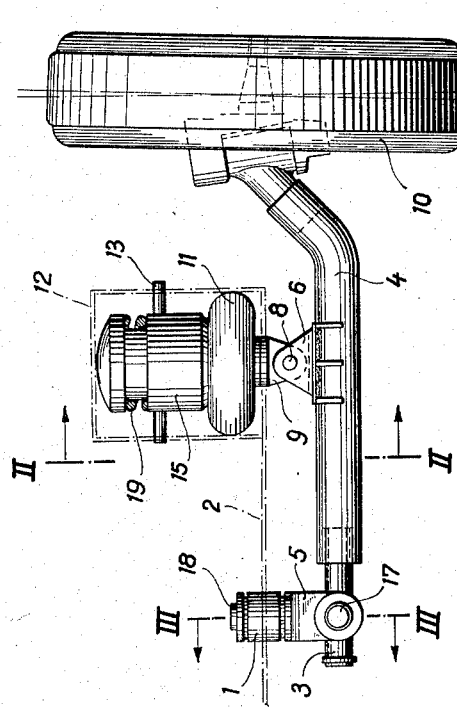
Figure 1 is a side elevation of the individual wheel support.

Referring now to the drawings, and in particular to Fig. 1, a bearing-block 1 is rigidly mounted on the base plate and the chassis 2, respectively, said bearing block 1 receiving a vertical shaft 18 which is rotatable upon its own axis. A bearing bridge 5 is secured in the bearing-block 1 and the end 3 of the half-axle 4 is mounted in the bearing bridge 5 (Figs. 3 and 4). The combination of the bearing-block 1 with the bearing bridge 5 is arranged in such a manner, that the half-axle 4 is axially movable in the bushing 16, turnable in vertical direction upon the pivots 17 and rotatably mounted on the vertical shaft 18.

Figure 2:
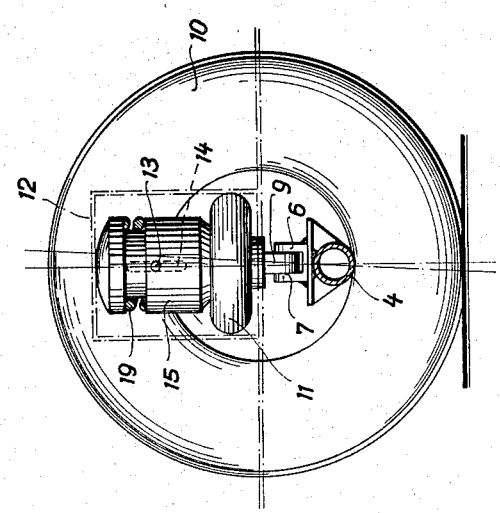
Fig. 2 is a section along the lines II—II of Fig. 1.

The half-axle 4, which is connected with the wheel 10, has also rigidly secured thereto a forked spindle bearing 6, the fork opening 7 of which is disposed parallel to the half-axle 4 (Fig. 2).

The spring-bodies 11 and 15 are rotatably secured to the spindle bearing 6 by means of the bolt 8 of the spindle bearing 6 with the plate member 9. The spring bodies consist of an annular spring-body 11 and a vertical spring-biased body 15, which bodies are guided in a cylindrical portion 12 of the chassis 2. An elastic air- or full-tire, for instance of rubber, is used advantageously as an annular spring-body 11, which engages with its periphery the cylindrical portion 12. The vertical spring-biased body 15 is limited in its vertical movement by the guide pins 13 by providing longitudinal slots 14, whereby the vertical shocks are received by the helical spring 19 disposed on top of the spring-biased body 15. Instead of providing guide pins 13 other additional spring-bodies (not shown) may be provided and other means may be used to limit the rising stroke.

The device operates in the following manner:

If a shock occurs which is directed axially towards the wheel 10, the force is transferred over the half-axle 4, the spindle-bearing 6, the bolt 8 and plate member 9 to the annular spring-body 11. The spring-body 11 receives the shock elastically and is compressed depending upon the size of the force, so that the shocks and forces effective against the cylinder 15 are received by the spring-body 11 and are absorbed by the latter. Any transfer of the force to the chassis 2 is greatly reduced. The axle end 3 slides simultaneously axially in the bearing bridge 5 dependent upon the compressibility of the spring-body 11, without again transferring the force to the chassis 2.

A shearing force or shock force effective from the front or the rear of the wheel is likewise transferred to the annular spring body 11 and received elastically by the latter. The half-axle 4 turns, thereby, over the bearing bridge 5 on the vertical shaft 18 dependent upon the compressibility of the spring-body 11, so that a transfer of the force over the bearing-block 1 to the chassis 2 is excluded.

All other shearing- or shock-forces, which are effective on the wheel in a plane disposed parallel to the half-axle, are received likewise by the annular spring-body 11, whereby the combination of the bearing-block 1 with the bearing bridge 5 causes a yielding of the axle dependent upon the size of the components of the force by axial movement and turning on the shaft 18.

Shocks which are effective vertically on the wheel 10 are received, however, elastically by the spring-biased body 15. The half-axle 4 turns on the pivots 17 in the bearing bridge 5. Due to the rotatable connection with the spindle-bearing 6, the spring-biased body 15 remains in its vertical position in the cylindrical portion 12 of the chassis 2 in each oblique position of the half-axle supported by the guide pins 13.

This arrangement of the present invention permits even the elastic reception of shocks on the wheel 10, which shocks are effective obliquely from below or obliquely from above.

By the advantageous connection of a vertical spring-body with a horizontal, all around effective, annular spring-body and by the disposal of the axle end in a pivot-bearing, in a swivel-bearing and in a journal bearing, a device is provided which receives elastically shearing- or shock-forces coming from all directions and which protects the chassis and the structure of the vehicle, respectively, from these shocks.

While I have disclosed one embodiment of the present invention, it is to be understood that this embodiment is given by example only and not in a limiting sense, the scope of the present invention being determined by the objects and the claim.

I claim:

An individual wheel support for vehicles of all types comprising a half-axle carrying a wheel and a chassis, said half-axle being yieldingly connected with said chassis crosswise to the direction of movement of said vehicles, universal bearing means for mounting said half-axle for upward, downward, forward, rearward and axial movement, and a shock absorber disposed between said half-axle and said chassis, said shock absorber comprising a tubular body of resilient material, adapted to absorb the horizontal shocks, and a spring-biased member secured to said tubular body and having a spring, operative in vertical direction, said spring-biased member being adapted to absorb the vertical shocks, and said universal bearing means comprising a U-member rotatably mounted in said chassis upon a vertically disposed pivot, and a bridge member rotatably mounted in said U-member, for turning upon a horizontal axis, said half-axle being received in said bridge member and axially movable relative to the latter, said spring-biased member comprising a hollow cylinder pivotally connected with said half-axle, said resilient tubular body surrounding said hollow cylinder and engaging a housing receiving said shock absorbers, a piston reciprocating in said cylinder, and a helical spring disposed in said cylinder and urging said piston outwardly towards said housing.

References Cited in the file of this patent

UNITED STATES PATENTS

| | | |
|---|---|---|
| 984,233 | Murphy | Feb. 14, 1911 |
| 1,958,623 | Hermann | May 15, 1934 |
| 2,105,781 | Dixon | Jan. 18, 1938 |